Sept. 12, 1967 R. H. HEDRICK ETAL 3,340,701
CRYSTALLIZATION

Filed June 3, 1964 2 Sheets-Sheet 1

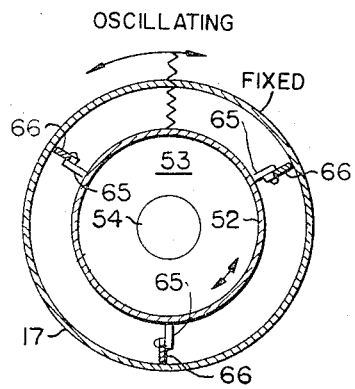
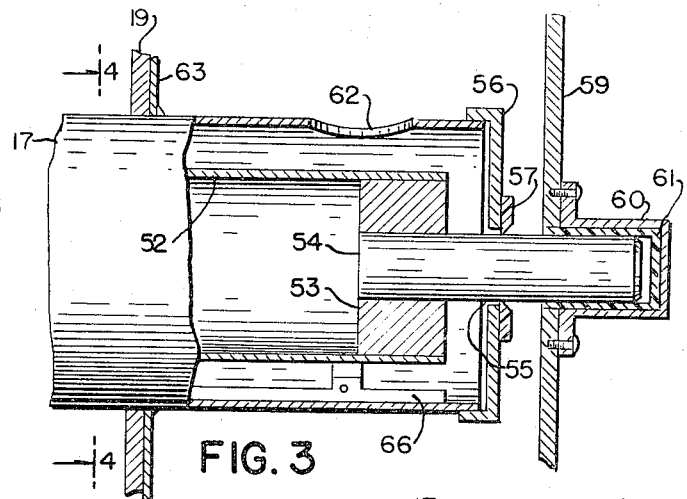
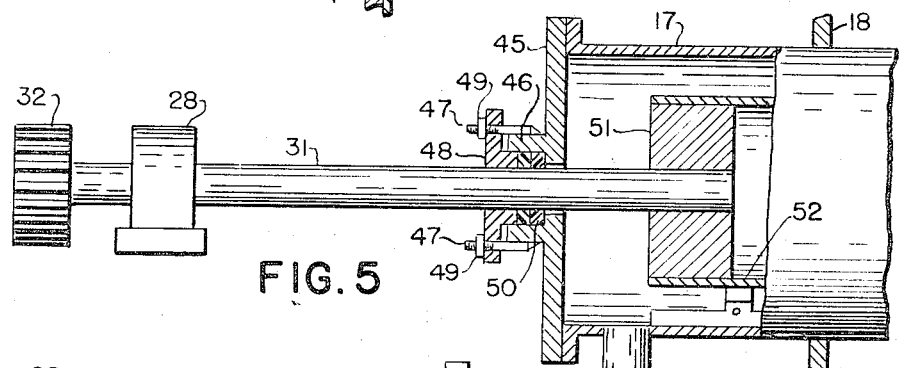
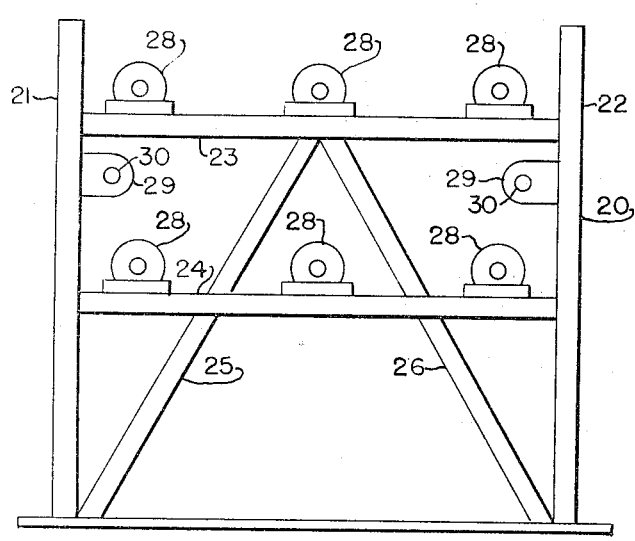

United States Patent Office 3,340,701
Patented Sept. 12, 1967

3,340,701
CRYSTALLIZATION
Robert H. Hedrick and Hans Svanoe, Warren, Pa., assignors to Struthers Scientific and International Corporation, New York, N.Y., a corporation of Delaware
Filed June 3, 1964, Ser. No. 372,168
4 Claims. (Cl. 62—58)

This invention relates in general to the freeze concentration of solutions and, more particularly, to a process and an apparatus for producing larger and more uniform crystals in a solution.

A simple crystallizer consists of a tube which is cooled on the outside and through which fluid is passed to freeze and form ice crystals. One problem which arises in such a crystallizer is the tendency of ice or other crystals to form against and adhere to the walls of the crystallizer. This problem has been overcome, in the past, by scraping the inner walls of the crystallizer. However, when ice crystals are scraped and broken from the sides of the crystallizer, the resulting crystals are small and irregular in size. Further, the scraping of crystals wastes the energy required to break them from the crystallizer walls and, while the crystals adhere to the crystallizer walls, they reduce the transfer of heat through the walls.

In the freeze concentration of comestibles, such as orange juice, apple juice, coffee extract, and the like, the ice crystals must be filtered or centrifuged out of solution in the freeze concentration process. Irregular and small crystals are difficult and even impossible to efficiently separate from solution. Thus it is desirable to produce larger and more uniform crystals.

When a fluid flows through a pipe or tube, there is a layer one molecule thick next to the wall of the pipe or tube that does not move. The next layer of molecules slide on this stationary layer and subsequent layers slide on each other in the same manner. Thus relatively stagnant layers of molecules remain near the wall. If heat is transferred from the fluid molecules to the wall in sufficient quantity, the molecules next to the wall will lose enough energy to form a crystal. When a solvent is crystallized from a solution, conditions are ideal for very rapid crystal growth at the tube wall. Molecules that are in the pores of the wall will cause crystals to become attached to the wall or crystals can become attached to the wall through electrostatic or other forces.

Solute molecules in a solvent being crystallized will tend to interfere with the crystallization of the solvent. The solvent molecules will have to move past the solute molecules to enter a crystal lattice. The solute molecules also tend to increase the viscosity of the solution which interferes with the transfer of heat from the crystal to the body of the fluid or the tube wall. Thus the crystal growth rate of a solvent is lower in more highly concentrated viscous solutions. Nevertheless, to prevent crystal growth on tube walls, it is necessary, even in the freeze concentration of relatively concentrated solutions, to remove the stagnant layer of film from the tube wall. The removal of the film from the tube wall must be very carefully controlled to produce large and uniform crystals. When agitator blades are used to remove subcooled liquid from the walls of a crystallizer, the process must take place within certain limits. If the agitator blades merely rotate continuously in one direction, the liquor has a tendency to rotate with the blades and only a slight amount of mixing will take place. With a slight amount of mixing, small crystals are produced because the subcooled solution becomes too highly supersaturated and spontaneously nucleates rather than depositing the supersaturation on existing crystals. To obtain the mixing of existing crystals with subcooled solution removed from the walls of a crystallizer, a minimum amount of mixing must be provided. There is also an upper limit to the amount of mixing as, at higher speeds of operation of agitator blades within a crystallizer, the increased agitation causes excessive nucleation and thus the formation of smaller crystals.

The size of a crystal produced in a given crystallizer in which proper mixing is provided is controlled by two main factors. These factors are the nucleation rate and the growth rate of the crystal. The nucleation rate determines the number of nuclei formed and therefore determines the maximum size to which a crystal may be grown with a given amount of feed and ideal growing conditions. The crystal growth rate determines the size to which a given crystal can be grown in a given length of time.

However, these two factors are interrelated. If the nucleation rate is low, the growth rate will increase as the supersaturation increases, but an increase of supersaturation will also provide an increase in nucleation. Thus an equilibrium point is reached where the growth rate and the nucleation rate are balanced under given conditions. The main factors which control the rate of nucleation and the rate of crystal growth in a given system are the viscosity of the solution and the amount of supersaturation or subcooling. Given proper mixing, it has been found that less subcooling provides larger crystals and that larger crystals may be grown in less concentrated solutions.

It is, therefore, an object of this invention to provide a process and an apparatus for the growth of larger and more uniform crystals in solution.

Another object of this invention is to provide a process and an apparatus which produce crystals which may be more easily separated from a slurry in the freeze concentration of comestibles.

Still another object of this invention is to provide a tubular crystallizer having an internal agitator which does not scrape the wall of the crystallizer while preventing crystals from forming on the wall.

A further object of this invention is to provide a tubular crystallizer containing an agitator which promotes the growth of larger and more uniform crystals.

A still further object of this invention is to provide a tubular crystallizer for the freeze concentration of comestibles having an internal agitator with bearings that cannot be jammed by the formation of ice crystals within the crystallizer.

Yet another object of this invention is to provide a less costly and more efficient tubular crystallizer containing an internal agitator.

Still another object of this invention is to provide a tubular crystallizer containing an internal agitator through which an ice slurry may be pumped without any possibility of stoppages and with a smaller expenditure of energy.

Many other objects, advantages and features of invention reside in the particular construction, combination and arrangement of parts involved in the embodiment of the invention and its practice as will be understood from the following description and the accompanying drawing wherein:

FIGURE 3 is a longitudinal vertical section through a fragment of the discharge end of the crystallizer with a crystallizer tube and its agitator shaft broken away in section to show internal construction;

FIGURE 4 is a section taken on line 4—4 of FIGURE 3;

FIGURE 5 is a longitudinal vertical section through a fragment of the input end of the crystallizer with a crystallizer tube and a portion of its agitator shaft broken away in section to show internal construction; and FIGURE 6 is an elevational view of the agitator shaft bearing support frame.

Figure 1:
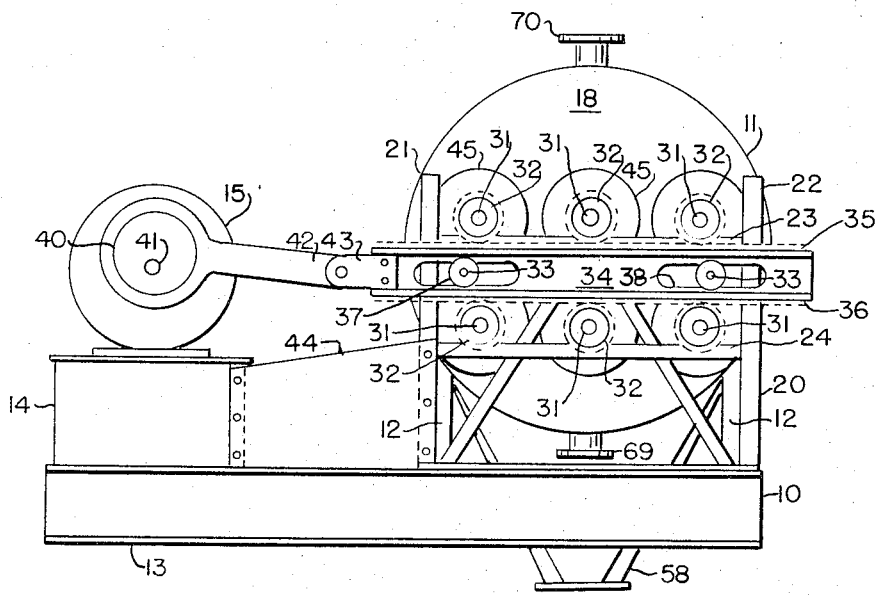
FIGURE 1 is an end view of the input end of a crystallizer according to this invention.
Figure 2:
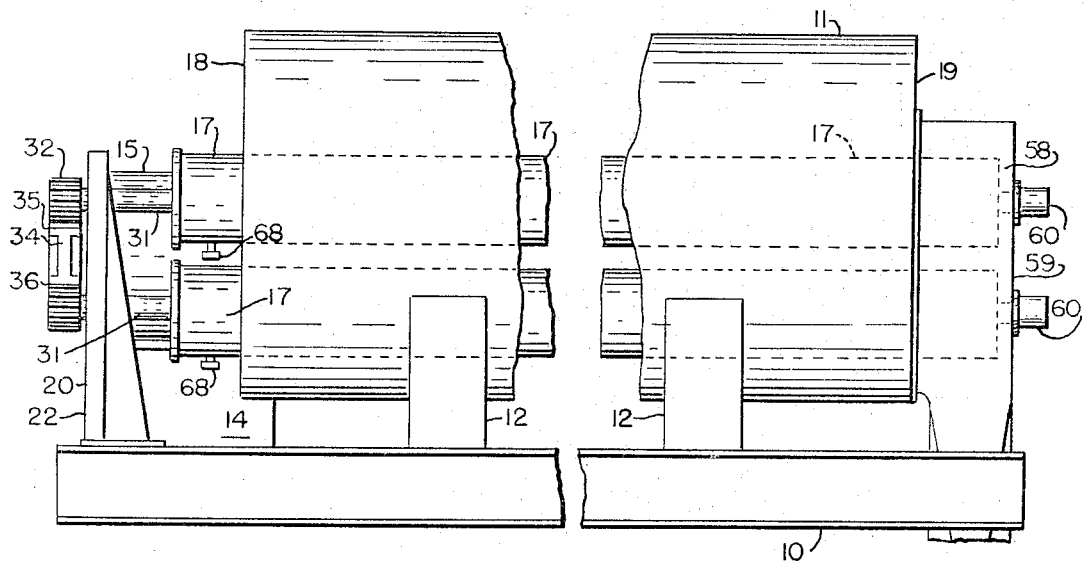
FIGURE 2 is a side view of the crystallizer of FIGURE 1 with a central portion broken away.

Referring to the drawing in detail, FIGURES 1 and 2 show the generally rectangular base frame 10 above which the crystallizer body 11 is supported by four legs 12. Extending laterally from one side of the inlet end of frame 10 is the integrally formed motor mount base frame 13. A raised box like platform 14 is fixed above base frame 13 to have motor 15 mounted on it.

Six crystallizer tubes 17 extend longitudinally through the crystallizer body 11 projecting beyond its end walls 18 and 19. Mounted on base frame 10 in front of the inlet ends of the crystallizer tubes 17 is the agitator shaft bearing support frame 20. As shown in FIGURE 6, this frame has two vertical side members 21 and 22 between which the upper and lower horizontal supports 23 and 24 extend. Brace members 25 and 26 stiffen the shaft bearing support frame. Six bearing blocks or pillow blocks 28 containing ball bearings are bolted or otherwise fixed to the horizontal supports 23 and 24. Two brackets 29 are welded to the vertical side members 21 and 22. The brackets 29 contain apertures 30 which are disposed at a level midway between the centers of the two rows of bearing blocks.

As shown in FIGURES 1 and 2, an agitator shaft 31 extends longitudinally from each crystallizer tube 17. Each agitator shaft 31 is rotatably journalled in a bearing block 28 and has a spur gear 32 fixed to its outer end. Two shafts 33 are fixed in the apertures 30 of brackets 29 to extend forward between the rows of spur gears 32. Rollers 37 are rotatably mounted on the shafts 33. An I-beam 34 is slidably mounted on the rollers 37 which engage the upper and lower edges of the slots 38 formed in the web of I-beam 34. Upper and lower rack gears 35 and 36 are fixed to the I-beam 34 and engage the spur gears 32. An eccentric 40 is mounted on shaft 41 of motor 15 to impart a reciprocating motion to I-beam 34 by means of arm 42 which is connected to beam 34 by means of a suitable bracket 43. A connecting plate 44 may extend between the raised platform 14 and the vertical member 21 to prevent any relative motion between these elements. Thus it may be seen that motor 15 drives the spur gears 32 with an oscillating motion.

Referring now to FIGURE 5, the inlet end of each crystallizer tube 17 has an end plate 45 bolted or otherwise fixed over it. A raised circular flange 46 extends about the shaft 31 and the center of plate 45 through which the shaft 31 passes. Bolts 47 are welded to the circular flange 46 so that a compression member 48 may be urged toward plate 45 when the nuts 49 are tightened. The compression member 48 compresses packing rings 50 disposed about shaft 31 within circular flange 46 to form a stuffing box or fluid tight seal about shaft 31. The inner end of shaft 31 has welded to it a cylindrical plug 51 about which one end of a tubular agitator shaft 52 is fixed.

Referring now to FIGURES 2 and 3, the crystallizer tubes 17 extend through the end wall 19 of the crystallizer body 11. A cylindrical plug 53 is fixed about the end of a shaft 54 which extends through an opening 55 in the end cover plate 56. Cover plate 56 and the end of tube 17 may be threaded so that cover plate 56 may be turned onto the end of tube 17. A plastic fluid seal 57 is fixed about the opening 55 to prevent the escape of fluid through it.

A discharge housing 58 having a rear wall 59 is fixed over the end wall 19 and about the discharge end of the crystallizer tubes 17. Bearing caps 60 are bolted about apertures in the rear wall 59 through which the shafts 54 extend. The bearing caps 60 contain Teflon shaft bearings 61 or the like. A large opening 62 is formed in the top of each crystallizer tube 17 within the discharge housing 58. Since it is desirable that all the elements contacting comestibles being freeze concentrated be made of stainless steel, a stainless steel covering 63 may be welded in place over end wall 19 within the discharge housing 58. The discharge housing 58 and the crystallizer tubes 17 are made of stainless steel.

As shown in FIGURES 3, 4 and 5, tabs 65 are welded to the tubular agitator shaft 52 at regular intervals along its length and they are equally spaced from each other about shaft 52. Agitator blades 66 are bolted to the tabs 65. These blades 66 do not scrape the inner walls of the crystallizer tubes 17, but they move past them with slight clearance.

Thus it may be seen that motor 15 imparts an oscillating motion to the spur gears 32 which, by means of the shafts 31, imparts an oscillating motion to the tubular agitator shafts and the agitator blades 66. The solution to be concentrated is pumped into the crystallizer tubes 17 through the fittings 68 to pass through the crystallizer tubes and emerge through the large openings 62 and fall downward within the discharge housing 58. A suitable refrigerant or cooling agent is pumped or allowed to flow through the connections 69 and 70 of the crystallizer body to cool the crystallizer tubes within the crystallizer body and form ice crystals in a fluid or slurry being passed through them.

This particular apparatus enjoys many advantages in that it is relatively inexpensive to construct and maintain. For cleaning purposes or for adjustment or replacement of the agitator blades, the tubular agitator shafts may be easily removed from either end of the apparatus. Further, while the solution passing through the crystallizer tubes completely fills the crystallizer tubes, it may readily escape through the large opening 72 with minimal hydraulic friction.

In the actual freeze concentration of coffee extracts, it has been found that the subcooled film on the wall of the crystallizer 17 is swirled clear of the wall and mixed with solution to obtain growth on existing nuclei if the blades 66 are adjusted to pass less than $\frac{1}{16}$ inch from the wall. If the blades 66 pass more than $\frac{1}{16}$ inch from the wall, ice crystals will form on it to reduce the transfer of heat through the wall. The ice crystals may then build out from the wall and jam the blades.

In a given crystallizer tube, the angle of rotation of the blades 66 may vary between limits. If the angle of rotation of the blades in a three-blade unit is less than 120 degrees, the size of the crystals grown will be affected in that smaller crystals will be grown and ice may build up on the crystallizer tube where it is not swept clear by the blades. If the angle of rotation is increased, the size of the crystals grown is not affected. In one experimental unit the angle of rotation was increased up to 310 degrees at the same number of cycles per minute of operation without any change in the size of the crystals produced. However, at a given cyclic rate, a greater angle of rotation requires an increased work input.

The actual number of cycles per minute at which the agitator blades oscillate does not directly alter crystal size. In one experiment, a crystallizer tube, which was 4 inches in diameter with its agitator blades 66 oscillating at 83 cycles per minute, produced the same maximum size of crystals as did a crystallizer tube which was 6 inches in diameter with its blades oscillating at 54 cycles per second. Thus it is the amount of mixing that is critical and not the rate of operation of apparatus of differing sizes. In a cylindrical crystallizer tube having blades 66, the blades should travel at least 350 inches per minute during their oscillations to provide sufficient mixing.

A 6 inch in diameter crystallizer tube 17 produced maximum sized crystals at 54 cycles per minute of its agitator blades 66. When the agitator blades were driven at the lower rate of 40 cycles per minute, smaller crystals were produced as the mixing was incomplete. When the blades were driven at the higher rate of 65 cycles per minute, smaller crystals were again produced as the increased agitation caused excessive nucleation.

Assuming proper mixing in a crystallizer tube 17, the size of the crystals produced varies according to the temperature change across the heat transfer surface. In the following example, a 6 inch crystallizer tube 17 was operated at a constant rate of output and with its mixing blades 66 driven at 44 cycles per minute.

| Percent Solution of Coffee Extract | Temperature Change Across Crystallizer Surface | | |
|---|---|---|---|
| | 5° F. | 10° F. | 15° F. |
| | Crystal sizes in mm. | | |
| 10 | 0.59 | 0.44 | 0.42 |
| 15 | 0.63 | 0.40 | 0.35 |
| 20 | 0.57 | 0.36 | 0.29 |
| 30 | 0.48 | 0.22 | 0.17 |
| 40 | 0.21 | 0.10 | 0.07 |

From the above example it may be seen that a smaller temperature change across a heat transfer surface allows larger crystals to be grown. However, to achieve a given output, the heat transfer area required becomes very large for smaller temperature changes across the heat transfer surface. This increases the apparatus cost for a given output so that a compromise must be found. In the freeze concentration of coffee extract, the temperature change across the heat transfer surface should be kept below 10° F. to grow large and more easily centrifuged crystals in crystallizers of moderate cost.

While this invention has been shown and described in the best form known, it will nevertheless be understood that this is purely exemplary and that modifications may be made without departing from the spirit and scope of the invention except as it may be more limited in the appended claims wherein—

What is claimed is:

1. In the process of freeze concentrating comestibles from the group consisting of orange juice, apple juice, and coffee extract in a solvent, the step of passing a solution through a horizontal freeze crystallizer tube to freeze solvent, while rotatably oscillating agitating blades through an arc less than 360° within the crystallizer tube close to the inner surface of the crystallizer tube but out of contact therewith, to avoid crystallization on the inner surface of said tubes, the blades moving at an average speed of at least 350 inches per minute and the temperature difference across the surface of the crystallization tube being less than 15° F.

2. A crystallizer comprising, in combination, a crystallizer body having end walls, crystallizer tubes extending through said crystallizer body and projecting beyond said end walls, said crystallizer tubes having inner surfaces, said crystallizer tubes each containing a large upwardly facing outlet opening disposed beyond one end wall of said crystallizer body and said crystallizer tubes each having an inlet in the end opposite said outlet opening, a discharge housing disposed about one end wall of said crystallizer body extending over the ends of said crystallizer tubes containing the outlet openings, rotatably mounted longitudinal shafts extending through each of said crystallizer tubes, blades mounted on said shafts extending at least the length of said crystallizer body, said blades having outer edges extending with small clearance toward the inner surfaces of said crystallizer tubes, and means rotatably oscillating said shafts moving said blades about the inner surfaces of said crystallizer tubes.

3. A crystallizer comprising, in combination, a crystallizer body having end walls, crystallizer tubes in two horizontal rows extending through said crystallizer body and having inlet ends and outlet ends projecting beyond said end walls, said crystallizer tubes having inner surfaces, said crystallizer tubes each containing a large upwardly facing outlet opening disposed beyond one end wall of said crystallizer body in said outlet end and said crystallizer tubes each having inlet means entering said inlet end, a discharge housing disposed about one end wall of said crystallizer body extending over said outlet ends of said crystallizer tubes, longitudinal shafts extending through each of said crystallizer tubes through the ends of said crystallizer tubes, first bearing means fixed to said discharge housing rotatably supporting said shafts, second bearing means beyond the inlet ends of said crystallizer tubes rotatably supporting said shafts, spur gears fixed to said shafts in two horizontal rows, blades mounted on said shafts extending at least the length of said crystallizer body, said blades having outer edges extending with small clearance toward the inner surfaces of said crystallizer tubes, a beam slidable mounted between the rows of said spur gears, upper and lower rack gears on said beam engaging said spur gears, and motor means reciprocating said beam rotatably oscillating said spur gears and said shafts moving said blades about the inner surfaces of said crystallizer tubes.

4. The combination according to claim 3 with the addition or rows of lugs extending outwardly from said shafts, said lugs being disposed equidistant from each other about said shafts, said blades being fixed to said lugs leaving a large clearance between said blades and said shafts.

References Cited
UNITED STATES PATENTS

| | | | |
|---|---|---|---|
| 285,879 | 10/1883 | Day | 62—342 |
| 1,113,807 | 10/1914 | Meisenhalter | 62—342 |
| 1,210,727 | 1/1917 | Tyson | 62—342 |
| 2,013,025 | 9/1935 | Bottoms | 62—58 |
| 2,150,792 | 3/1939 | Willat | 62—343 |
| 2,259,841 | 10/1941 | Spiegl | 62—58 |
| 2,284,907 | 6/1942 | Kinzey | 62—342 |
| 2,538,716 | 1/1951 | Wakeman | 62—342 |
| 2,767,553 | 10/1956 | Lewis | 62—342 |

NORMAN YUDKOFF, *Primary Examiner.*

WILBUR L. BASCOMB, JR., *Examiner.*

G. HINES, *Assistant Examiner.*